Patented Feb. 29, 1944

2,342,794

UNITED STATES PATENT OFFICE 2,342,794

LONG-CHAIN ALIPHATIC ISOCYANIDES

Henry Dreyfus, London, England, assignor to Celanese Corporation of America, a corporation of Delaware No Drawing. Application March 10, 1942, Serial No. 434,063. In Great Britain March 10, 1941

14 Claims. (Cl. 260—464)

This invention relates to long chain aliphatic isocyanides and processes of making them.

According to the invention long chain aliphatic compounds having an —NH₂ group are subjected to reaction with a highly halogenated derivative of methane and a caustic alkali to produce a carbylamine.

The invention is mainly concerned with the production of carbylamines containing 10 or more and especially 15 or more carbon atoms, such as palmityl and stearyl carbylamines. Such compounds are new in themselves and differ from the well known carbylamines such as methyl, ethyl and phenyl carbylamines by being white solids in the pure state. The new compounds possess properties which render them very valuable in the production and in the treatment of textile materials.

In carrying out the process of the invention the most convenient starting material to use is an amine, for instance palmitylamine or stearylamine but, if desired, compounds in which the —NH₂ group forms part of an amide group or a hydrazine group may also be used. The halogenated methane derivative used can very conveniently be chloroform, but carbon tetrachloride or tetrabromide, bromoform, iodoform and other halogen compounds including halogen derivatives of other hydrocarbons than methane, for example highly halogenated derivatives of ethane, may also be used. Caustic potash has given excellent results in the process and may be used either in powdered form or dissolved in a suitable solvent, for instance methyl or ethyl alcohol. Caustic soda may be used similarly.

In practice it is best to dissolve the stearylamine or other compound containing the —NH₂ group in the chloroform or other halogenated hydrocarbon and then to add the caustic potash and heat the mixture under reflux. Usually refluxing for a period of about one hour is sufficient to result in the production of the desired carbylamine in excellent yield. After the refluxing operation the inorganic salt produced in the process, e. g., potassium chloride where chloroform and caustic potash are the reagents used, is separated as a precipitate from the liquid part of the reaction product by filtration, after which the filtrate is distilled to free it from excess chloroform or other halogenated hydrocarbon and any alcohol or other solvent used as a medium for introducing the caustic alkali, leaving a residue of carbylamine, unchanged caustic alkali and inorganic salt such as potassium chloride. The caustic alkali and salt can be removed by treatment of the product with warm water, when the carbylamine forms an upper layer. It is most convenient to separate this upper layer as a solution in a suitable solvent, e. g., ethyl ether, the solution being dried and the solvent then distilled off. Distillation of the carbylamine thus obtained gives a pure white product of fairly low melting point, e. g., stearyl carbylamine obtained in the manner described melts at 60° C. and boils with some decomposition under atmospheric pressure at 320–325° C.

While the invention has been described more particularly in connection with the production of stearyl carbylamine and other alkyl carbylamines of high molecular weight the invention may also be applied to the production of substituted carbylamines, e. g., hydroxy and carboxy and etherified hydroxy and esterified carboxy carbylamines.

The following example illustrates the invention as applied to the production of stearyl carbylamine.

Example 5 parts by weight of stearylamine are dissolved in 22–25 parts by weight of chloroform and the mixture is charged into a reaction vessel fitted with a reflux condenser. A solution of 3–4 parts by weight of potassium hydroxide in 25 parts by weight of methyl alcohol is then slowly added and the mixture is refluxed for an hour, during which time a white precipitate of potassium chloride is deposited. The reaction product is cooled and filtered, after which the filtrate is distilled under atmospheric pressure to remove alcohol and chloroform and leave a residue of stearyl carbylamines containing some potassium chloride and potassium hydroxide. This residue is mixed with warm water whereupon the potassium chloride and caustic potash dissolve and the stearyl carbylamine floats on the surface of the solution. The stearyl carbylamine is then extracted with ether, dried over anhydrous sodium sulphate and distilled under reduced pressure, the fraction boiling between 215 and 225° C. under 14 mms. pressure being collected.

The product, stearyl carbylamine, which is insoluble in water, is readily soluble in ether, benzene and carbon tetrachloride and solidifies to a white body melting at 60° C., boiling with decomposition at 320–325° C. at atmospheric pressure.

Having described my invention, what I desire to secure by Letters Patent is:

1. Aliphatic carbylamines comprising a chain of at least 10 carbon atoms.
2. Aliphatic carbylamines comprising a chain of at least 15 carbon atoms.
3. Stearyl carbylamine.
4. Palmityl carbylamine.
5. Process for the production of long chain aliphatic carbylamines which comprises subjecting aliphatic compounds containing a chain of at least 10 carbon atoms and an NH₂ group to reaction with a highly halogenated derivative of a hydrocarbon and a caustic alkali.
6. Process for the production of long chain aliphatic carbylamines which comprises subjecting aliphatic compounds containing a chain of at least 15 carbon atoms and an NH₂ group to reaction with a highly halogenated derivative of a hydrocarbon and a caustic alkali.
7. Process for the production of long chain aliphatic carbylamines which comprises subjecting aliphatic compounds containing a chain of at least 15 carbon atoms and an NH₂ group to reaction with a highly halogenated compound of methane and a caustic alkali.
8. Process for the production of long chain aliphatic carbylamines which comprises subjecting aliphatic compounds containing a chain of at least 15 carbon atoms to reaction with chloroform and a caustic alkali.
9. Process for the production of stearyl carbylamine which comprises subjecting stearylamine to reaction with a highly halogenated derivative of methane and a caustic alkali.
10. Process for the production of stearyl carbylamine which comprises subjecting stearylamine to reaction with chloroform and a caustic alkali.
11. Process for the production of long chain aliphatic carbylamines which comprises dissolving an aliphatic compound containing a chain of at least 10 carbon atoms and an NH₂ group in a highly halogenated derivative of a hydrocarbon, mixing therewith a caustic alkali in solution in an inert solvent, and heating the resulting mixture under reflux.
12. Process for the production of stearyl carbylamine which comprises dissolving stearylamine in chloroform, mixing therewith a solution of a caustic alkali in an inert solvent, and heating the resulting mixture under reflux.
13. Process for the production of palmityl carbylamine, which comprises dissolving palmitylamine in chloroform, mixing therewith a solution of a caustic alkali in an inert solvent, and heating the resulting mixture under reflux.
14. Process for the production of stearyl carbylamine, which comprises heating under reflux a mixture of a solution of stearylamine in chloroform and a solution of potasium hydroxide in methyl alcohol.

HENRY DREYFUS.